(12) United States Patent
Orlitzky

(10) Patent No.: US 9,151,443 B2
(45) Date of Patent: Oct. 6, 2015

(54) FLUID HOLDER AND ELECTROMECHANICAL LUBRICATOR EMPLOYING SAME

(71) Applicant: STEPHANIA HOLDINGS INC., Delta (CA)

(72) Inventor: Stephan Karl Orlitzky, Delta (CA)

(73) Assignee: STEPHANIA HOLDINGS INC., Delta, BC (CA)

( * ) Notice: Subject to any disclaimer, the term of this patent is extended or adjusted under 35 U.S.C. 154(b) by 273 days.

(21) Appl. No.: 13/763,732

(22) Filed: Feb. 10, 2013

(65) Prior Publication Data

US 2014/0224587 A1 Aug. 14, 2014
US 2014/0367200 A9 Dec. 18, 2014

Related U.S. Application Data

(63) Continuation of application No. 12/390,481, filed on Feb. 22, 2009, now abandoned.

(51) Int. Cl.
*F16N 11/08* (2006.01)

(52) U.S. Cl.
CPC ...................................... *F16N 11/08* (2013.01)

(58) Field of Classification Search
CPC ....................................................... F16N 11/08
USPC ........................................................... 184/37
See application file for complete search history.

(56) References Cited

U.S. PATENT DOCUMENTS

| | | | |
|---|---|---|---|
| 612,075 A | 10/1898 | Webendorder | |
| 897,849 A | 9/1908 | Prescott | |
| 1,162,997 A | 12/1915 | Ferguson | |
| 1,277,842 A | 9/1918 | Brinser | |
| 1,561,308 A | 11/1925 | Brown | |
| 1,696,774 A | 12/1928 | Martin | |
| 1,720,398 A | 7/1929 | Harrigan | |
| 1,813,183 A | 7/1931 | Mathewson | |
| 1,834,321 A | 12/1931 | Tervo | |
| 1,878,115 A | 9/1932 | Cosse | |
| 1,905,913 A | 4/1933 | Kopp | |
| 1,918,145 A | 7/1933 | Stern | |
| 1,996,929 A | 4/1935 | Mays | |
| 2,566,702 A | 9/1951 | Harrigan | |

(Continued)

FOREIGN PATENT DOCUMENTS

| | | |
|---|---|---|
| CA | 813195 | 5/1969 |
| CA | 961420 | 1/1975 |

(Continued)

*Primary Examiner* — William E Dondero
*Assistant Examiner* — Robert T Reese

(57) ABSTRACT

A fluid holder includes: a housing having an inner surface and at least one fluid outlet; a piston in slidable engagement with the inner surface and having first and second opposed surfaces with a threaded opening extending therebetween, the first surface of the piston and the inner surface of the housing defining a fluid chamber in communication with the at least one fluid outlet; and a threaded member engageable with the threaded opening, a first portion of the threaded member extending from the first surface of the piston, the threaded member being rotatably coupled to the housing on the first portion of the threaded member for rotation in the threaded opening of the piston such that rotation of the threaded member causes a force to be exerted by the threaded member on the housing and on the piston to expand or contract the fluid chamber.

15 Claims, 5 Drawing Sheets

(56) References Cited

U.S. PATENT DOCUMENTS

| | | |
|---|---|---|
| 2,694,508 A | 11/1954 | Petrenchak |
| 2,731,173 A | 1/1956 | Harrigan |
| 2,754,931 A | 7/1956 | Riker |
| 2,807,215 A | 9/1957 | Hawxhurst |
| 2,823,768 A | 2/1958 | Taylor |
| 2,852,098 A | 9/1958 | Benson |
| 2,877,935 A | 3/1959 | Sherbondy |
| 2,899,017 A | 8/1959 | Lljemark |
| 2,924,359 A | 2/1960 | Beremand |
| 2,979,897 A | 4/1961 | Studhalter et al. |
| 2,984,188 A | 5/1961 | Tuckey et al. |
| 3,115,280 A | 12/1963 | Battista |
| 3,214,067 A | 10/1965 | Linington |
| 3,244,333 A | 4/1966 | Kohn et al. |
| 3,424,022 A | 1/1969 | Greenberg et al. |
| 3,430,731 A | 3/1969 | Satzinger |
| 3,608,672 A | 9/1971 | Dandridge |
| 3,622,048 A | 11/1971 | Batlas |
| 3,774,721 A | 11/1973 | Hollowell |
| 3,815,787 A | 6/1974 | Spies |
| 3,822,607 A | 7/1974 | Tharaldsen |
| 3,842,939 A | 10/1974 | Satzinger |
| 3,983,959 A | 10/1976 | Satzinger |
| 3,984,033 A | 10/1976 | Groth et al. |
| 3,987,869 A | 10/1976 | Bowers |
| 4,006,797 A | 2/1977 | Keske |
| 4,023,648 A | 5/1977 | Orlitzky |
| 4,171,072 A | 10/1979 | Davis, Jr. |
| 4,257,540 A | 3/1981 | Wegmann et al. |
| 4,286,691 A | 9/1981 | Stong |
| 4,328,843 A | 5/1982 | Fujii |
| 4,640,445 A | 2/1987 | Yamada |
| 4,671,386 A | 6/1987 | Orlitzky |
| 4,711,320 A | 12/1987 | Dombroski et al. |
| 4,744,442 A | 5/1988 | Bras et al. |
| 4,770,613 A | 9/1988 | Hoover et al. |
| 4,799,574 A | 1/1989 | Bras |
| 4,836,334 A | 6/1989 | Bras |
| 4,941,550 A | 7/1990 | Blake |
| 5,012,897 A | 5/1991 | Jorissen |
| 5,105,912 A | 4/1992 | Heister |
| 5,125,480 A | 6/1992 | Gregory et al. |
| 5,181,585 A | 1/1993 | Braun et al. |
| 5,242,033 A | 9/1993 | Toraason |
| 5,242,565 A | 9/1993 | Winsel |
| 5,271,528 A | 12/1993 | Chien |
| 5,285,871 A | 2/1994 | Sievenpiper |
| 5,354,264 A | 10/1994 | Bae et al. |
| 5,404,966 A | 4/1995 | Yang |
| 5,409,084 A | 4/1995 | Graf |
| 5,417,308 A | 5/1995 | Hartl |
| 5,423,454 A | 6/1995 | Lippman et al. |
| 5,427,870 A | 6/1995 | Joshi et al. |
| 5,460,242 A | 10/1995 | Graf |
| 5,538,605 A | 7/1996 | Joshi et al. |
| 5,547,043 A | 8/1996 | Graf et al. |
| 5,567,287 A | 10/1996 | Joshi et al. |
| 5,573,646 A | 11/1996 | Saito et al. |
| 5,593,552 A | 1/1997 | Joshi et al. |
| 5,622,239 A | 4/1997 | Orlitzky |
| 5,634,531 A | 6/1997 | Graf et al. |
| 5,667,037 A | 9/1997 | Orlitzky |
| 5,728,487 A | 3/1998 | Gratzel et al. |
| 5,732,794 A | 3/1998 | Orlitzky |
| 5,785,688 A | 7/1998 | Joshi et al. |
| 5,968,325 A | 10/1999 | Oloman et al. |
| 5,971,229 A | 10/1999 | May et al. |
| 6,012,551 A | 1/2000 | Raab |
| 6,299,743 B1 | 10/2001 | Oloman et al. |
| 6,408,985 B1 | 6/2002 | Orlitzky et al. |
| 6,675,992 B2 | 1/2004 | Schumann |
| D490,671 S | 6/2004 | Hung |
| 6,802,394 B2 | 10/2004 | Patterson et al. |
| 6,835,298 B2 | 12/2004 | Oloman et al. |
| D510,242 S | 10/2005 | Chen |
| D523,303 S | 6/2006 | Amin |
| 7,168,595 B2 | 1/2007 | Ling |
| 7,228,941 B2 | 6/2007 | Weigand et al. |
| 7,306,711 B2 | 12/2007 | Oloman et al. |
| 7,429,315 B2 | 9/2008 | Oloman et al. |
| 2004/0031695 A1 | 2/2004 | Oloman et al. |
| 2007/0108045 A1 | 5/2007 | Oloman et al. |
| 2008/0060879 A1 | 3/2008 | Orlitzky et al. |
| 2009/0133962 A1 | 5/2009 | Orlitzky et al. |

FOREIGN PATENT DOCUMENTS

| | | |
|---|---|---|
| CA | 1280700 | 2/1991 |
| CA | 1333579 | 12/1994 |
| CH | 567679 | 10/1975 |
| DE | 25435 | 12/1882 |
| DE | 343551 | 11/1921 |
| DE | 166690 | 1/1934 |
| DE | 1256001 | 12/1967 |
| DE | 2013504 | 10/1970 |
| DE | 2157670 | 11/1971 |
| DE | 3530212 C1 | 10/1986 |
| DE | 3718342 C1 | 9/1988 |
| DE | 3718357 C1 | 11/1988 |
| DE | 3718341 A1 | 12/1988 |
| DE | 3726473 A1 | 2/1989 |
| DE | 38 11 468 | 10/1989 |
| DE | 3811469 A1 | 10/1989 |
| DE | 3924118 A1 | 1/1991 |
| DE | 9309575 | 11/1993 |
| DE | 44 05 006 | 8/1994 |
| EP | 0 581 795 | 2/1994 |
| EP | 0704654 A1 | 4/1996 |
| EP | 0 982 527 | 3/2000 |
| GB | 413021 | 7/1934 |
| GB | 561250 | 5/1944 |
| GB | 901161 | 1/1962 |
| GB | 2195713 A | 4/1988 |
| IT | 347340 | 12/1936 |
| JP | 63203993 | 8/1988 |
| JP | 10-019193 | 1/1998 |
| KR | 10-0055954-0000 | 5/1991 |
| SU | 316415 | 12/1971 |
| SU | 1710890 | 2/1992 |
| WO | WO 89/09884 | 10/1989 |
| WO | WO 01/33133 | 5/2001 |

FLUID HOLDER AND ELECTROMECHANICAL LUBRICATOR EMPLOYING SAME

This application claims priority as a CONTINUATION of prior U.S. patent application Ser. No. 12/390,481, filed Feb. 22, 2009, the disclosure of which priority is claimed and incorporated herein in its entirety by reference.

BACKGROUND OF THE INVENTION

1. Field of Invention

The invention relates generally to lubrication, and more particularly to a fluid holder and an electromechanical lubricator employing the same.

2. Description of Related Art

Known electromechanical lubricators include fluid holders that are detachably coupled to drive assemblies. In known electromechanical lubricators, the drive assembly causes rotation of a threaded member that is threaded through a threaded piston, urging the threaded piston in a direction that tends to expel fluid out of a fluid chamber through a fluid outlet. However, particularly with viscous fluids, rotation of the threaded member tends to cause pressure to accumulate in the fluid chamber, which results in a thrust force along the threaded member against the drive assembly.

The thrust force exerted by the threaded member against the drive assembly can cause increased friction in the drive assembly. This increased friction may accelerate wear of the drive assembly, for example by causing misalignment of gears in the drive assembly, which may result in reduced life span for the drive assembly.

The increased friction also requires delivery of more power by the drive assembly, thereby shortening the life span of batteries or other power sources for the drive assembly. The increased friction from the thrust force on the drive assembly may also limit the pressure that the drive assembly can exert on the fluid, and may limit the temperature range in which the lubricator can operate. Also, an accumulation of thrust force on the threaded member can cause the drive assembly of the lubricator to separate from the lubricator, and this potential for a significant accumulation of thrust force on the threaded member can cause disassembly of the lubricator to be difficult or unsafe.

SUMMARY OF THE INVENTION

In accordance with one aspect of the invention, there is provided a fluid holder. The fluid holder includes a housing having an inner surface defining a cavity, the housing defining at least one fluid outlet in communication with the cavity. The fluid holder also includes a piston in slidable engagement with the inner surface, the piston having first and second opposed surfaces with a threaded opening extending between the first and second surfaces, the first surface of the piston and the inner surface of the housing defining a fluid chamber in the cavity in communication with the at least one fluid outlet, and the piston being movable to expand or contract the fluid chamber.

The fluid holder also includes a threaded member engageable with the threaded opening of the piston, a first portion of the threaded member extending from the first surface of the piston and a second portion of the threaded member extending out of the second surface of the piston, the threaded member being rotatably coupled to the housing on the first portion of the threaded member for rotation in the threaded opening of the piston such that rotation of the threaded member causes a force to be exerted by the threaded member on the housing and on the piston to move the piston in the cavity to expand or contract the fluid chamber.

The inner surface may include a cylindrically shaped sliding portion, and the piston may be in slidable engagement with the cylindrically shaped sliding portion.

The inner surface may also include a frustoconical terminating portion.

The first surface of the piston may be shaped complementarily to the frustoconical terminating portion.

The fluid holder may further include a mixer in communication with the first portion of the threaded member, the mixer configured to mix fluid urged out said at least one fluid outlet.

The mixer may include an auger configured to urge a fluid in a direction into the fluid chamber when the threaded member is rotated in a direction that causes the fluid chamber to contract.

The mixer may include an auger configured to urge a fluid in a direction out of the fluid chamber when the threaded member is rotated in a direction that causes the fluid chamber to contract.

The mixer may include a plurality of radial projections.

The piston may be in sealed engagement with the inner surface, and the fluid chamber may be open only at the at least one fluid outlet.

The second portion of the threaded member may be configured to be detachably coupled to a drive member for applying a torque to the threaded member.

The fluid holder may further include a drive assembly configured to be detachably coupled to the fluid holder, the drive assembly having a motor and a drive member coupled to the motor and configured to be detachably coupled to the second portion of the threaded member of the fluid holder for applying a torque to the threaded member.

The fluid holder may further include a processor circuit in communication with the motor for controlling the motor, the processor circuit operably configured to respond to signals received from a temperature sensor sensing a temperature of an object to be lubricated, to cause the motor to deliver more fluid from the fluid chamber when the object to be lubricated is at a higher temperature Other aspects and features of the present invention will become apparent to those ordinarily skilled in the art upon review of the following description of specific embodiments of the invention in conjunction with the accompanying figures.

BRIEF DESCRIPTION OF THE DRAWINGS

Aspects of the invention are illustrated, merely by way of example, in the accompanying drawings, in which.

DETAILED DESCRIPTION

Figure 1:
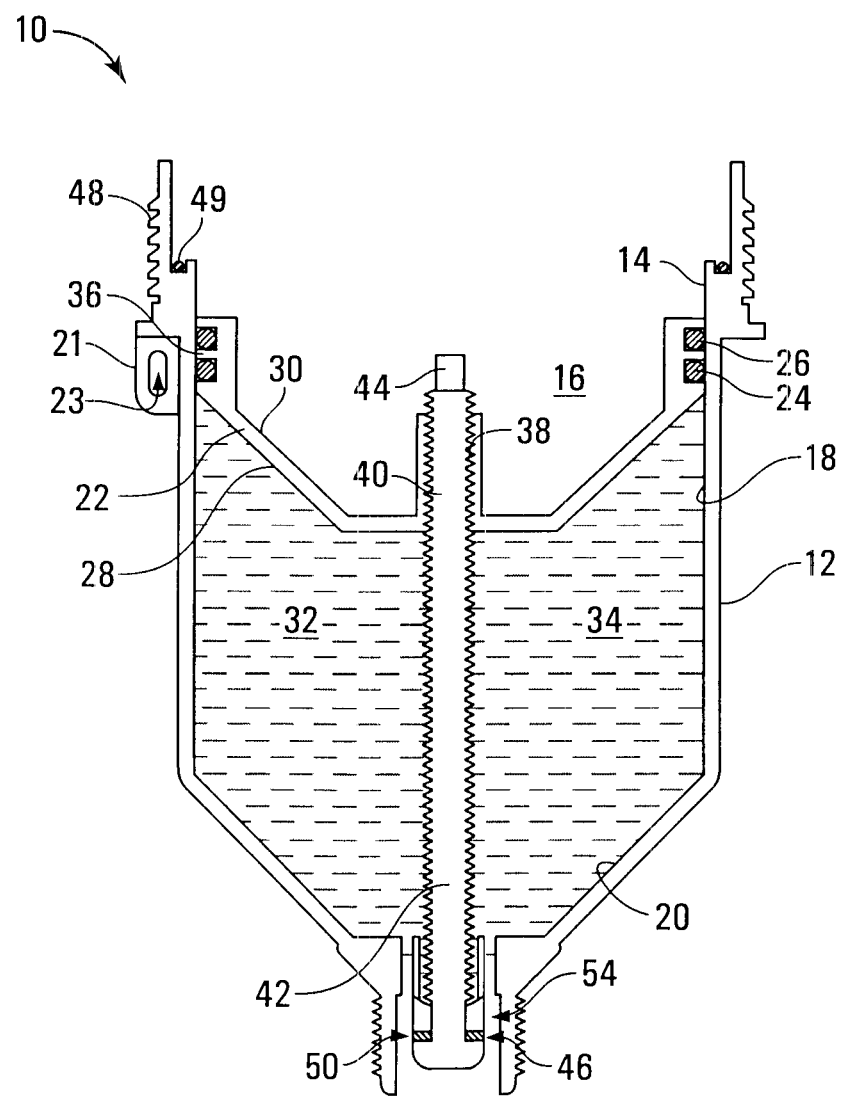
FIG. 1 is a front cross sectional view of a fluid holder according to a first embodiment of the invention.

Referring to FIG. 1, a fluid holder according to a first embodiment of the invention is shown generally at 10. The fluid holder 10 includes a housing 12 having an inner surface 14 that defines a cavity 16. In the illustrated embodiment, the inner surface 14 includes a cylindrically shaped sliding portion 18 and a generally frustoconical terminating portion 20. Alternatively, the terminating portion of inner surface 14 may be conical, for example. Housing 12 preferably includes a tie-down 21 defining an eyelet 23, and the eyelet 23 may receive a cord to facilitate attaching fluid holder 10 to an object (not shown), for example. However, it will be appreciated that equivalent results can be achieved with other configurations of the housing 12.

A piston 22 is positioned in cavity 16 in slidable engagement with sliding portion 18 of the inner surface 14. Piston 22 preferably includes sealing members such as O-rings 24 and 26 to facilitate slidable and sealed engagement with the inner surface 14. Piston 22 includes a first surface 28 and an opposed second surface 30, and is positioned in cavity 16 such that first surface 28 and inner surface 14 of housing 12 define a fluid chamber 32 in cavity 16. In the illustrated example, the fluid chamber 32 holds a fluid, such as a lubricant 34. Also, in the illustrated example, piston 22 has a circular outer flange 36 to engage cylindrical sliding portion 18 of inner surface 14, and first surface 28 of piston 22 is generally frustoconically shaped to complement terminating portion 20 of inner surface 14. Advantageously, this complementary configuration may enable first surface 28 of piston 22 to abut terminating portion 20 of inner surface 14 to force substantially all of lubricant 34 out of fluid chamber 32. Piston 22 further defines a threaded opening 38 extending between the first surface 28 and the second surface 30 of the piston 22.

Figure 2:
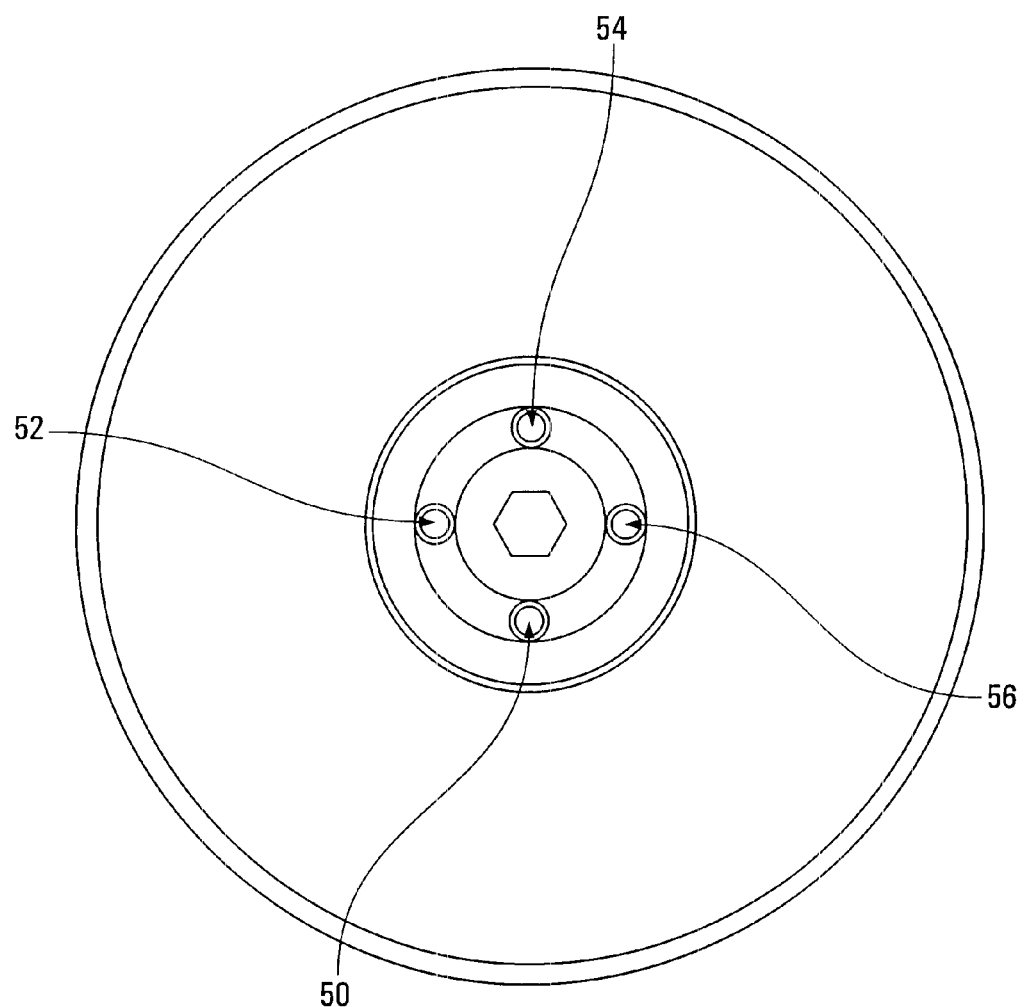
FIG. 2 is a bottom view of the fluid holder of FIG. 1.

Housing 12 defines at least one fluid outlet 50 in communication with fluid chamber 32, and preferably fluid chamber 32 is open only at the at least one fluid outlet 50. Referring to FIG. 2, the illustrated embodiment includes four fluid outlets 50, 52, 54, and 56, although it will be appreciated that other embodiments may include any number of fluid outlets. Returning to FIG. 1, when piston 22 slides along sliding portion 18 of the inner surface 14, first surface 28 of the piston 22 exerts a force on lubricant 34 in the fluid chamber 32, urging lubricant 34 out fluid outlets 50, 52, 54, and 56.

Fluid holder 10 further includes a threaded shaft 40 (which may also be referred to as a "threaded member") which is in sealed threaded engagement with threaded opening 38 of piston 22. Threaded shaft 40 includes a first portion 42 extending out of first surface 28 of piston 22, and a second portion 44 extending out of second surface 30 of piston 22. Second portion 44 of threaded shaft 40 may be configured to be detachably coupled to a drive member for applying a torque, for example by having a recess for receiving a tool bit or by any other known configuration. The first portion 42 of the threaded shaft 40 is rotatably coupled to the housing 12 for rotation in the threaded opening 38 of the piston 22. In the illustrated example, a thrust bearing 46 positioned between the fluid outlets 50, 52, 54, and 56 is supported by the housing 12, and supports the threaded shaft 40 for rotation. Thrust bearing 46 may be a washer manufactured from Delrin™, which is available from Dupont™, for example.

Therefore, in operation, rotation of threaded shaft 40 may cause a force to be exerted by threaded shaft 40 on housing 12 and on piston 22 to urge piston 22 towards terminating portion 20 of inner surface 14, urging lubricant 34 out of fluid chamber 32 through the at least one fluid outlet 50. Pressure exerted by lubricant 34 on first surface 28 of piston 22 results in a thrust force on threaded shaft 40. Advantageously, the thrust force on threaded shaft 40 is accommodated in the illustrated embodiment by thrust bearing 46, and therefore a thrust force will not be exerted on a drive assembly that is applying a torque to the second portion 44 of the threaded shaft 40.

In the illustrated embodiment, housing 12 includes an external threaded surface 48 for engagement with a drive assembly (illustrated in FIG. 5, for example), and a sealing member such as an O-ring 49 for sealing the cavity 16 from the outside when the fluid holder 10 is coupled to a drive assembly.

Figure 3:
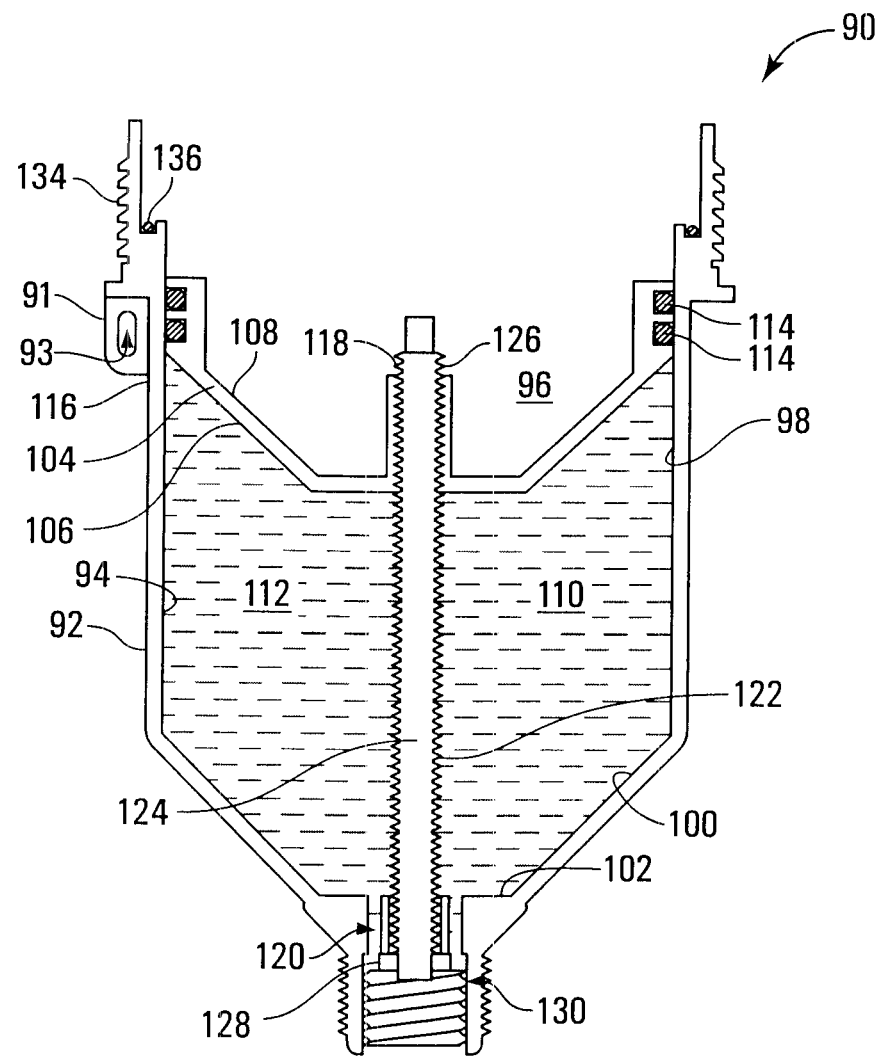
FIG. 3 is a front cross sectional view of a fluid holder according to a second embodiment of the invention.

Referring to FIG. 3, a fluid holder according to a second embodiment of the invention is shown generally at 90. Fluid holder 90 includes a housing 92 having an inner surface 94 that defines a cavity 96. In the illustrated embodiment, the inner surface 94 includes a cylindrically shaped sliding portion 98 and a frustoconically shaped terminating portion 100 that includes a generally flat surface 102. Housing 92 preferably includes a tie-down 91 defining an eyelet 93, and the eyelet 93 may receive a cord to facilitate attaching fluid holder 90 to an object (not shown), for example.

The fluid holder 90 further includes a piston 104 positioned in cavity 96 in slidable engagement with sliding portion 98 of inner surface 94. Piston 104 includes a first surface 106 and a second opposite surface 108, and is positioned in cavity 96 such that first surface 106 and inner surface 94 define a fluid chamber 110 in cavity 96 for holding a fluid such as a lubricant 112, for example. First surface 106 of piston 104 is preferably frustoconically shaped to complement terminating portion 100 of inner surface 94, which may advantageously enable first surface 106 to abut terminating portion 100 to force substantially all of lubricant 112 out of fluid chamber 110. Piston 104 also preferably includes a circular outer flange 116 having sealing members such as O-rings 114 to facilitate slidable and sealed engagement with sliding portion 98 of inner surface 94. Piston 104 further defines a threaded opening 118 extending between the first surface 106 and the second surface 108.

Housing 92 defines at least one fluid outlet 120 in communication with the fluid chamber 110 such that when piston 104 slides along sliding portion 98, first surface 106 exerts a force on lubricant 112 to urge lubricant 112 out of the at least one fluid outlet 120.

Fluid holder 90 further includes a threaded shaft 122 (which may also be referred to as a "threaded member"), which is in threaded engagement with threaded opening 118 of piston 104. Threaded shaft 122 includes a first portion 124 extending out of first surface 106, and a second portion 126 extending out of second surface 108. The first portion 124 is rotatably coupled to housing 92 at a thrust bearing 128 for rotation in threaded opening 118. Thrust bearing 128 may be a washer manufactured from Delrin™, which is available from Dupont™, for example. Therefore, rotation of threaded shaft 122 may cause a force to be exerted by threaded shaft 122 on housing 92 and on piston 104 to urge piston 104 towards terminating portion 100, urging lubricant 112 out of fluid chamber 110 through the at least one fluid outlet 120. Pressure exerted by lubricant 112 on first surface 106 results in a thrust force that is accommodated by thrust bearing 128. Advantageously, thrust force on threaded shaft 122 will not be exerted on a drive assembly that is applying a torque to second portion 126 of threaded shaft 122. Second portion 126 may be configured to be detachably coupled to a drive member for applying a torque to threaded shaft 122.

Housing 92 also preferably includes an external threaded surface 134 for engagement with a drive assembly (illustrated in FIG. 5, for example), and a sealing member such as an O-ring 136 for sealing cavity 96 from the outside when fluid holder 90 is coupled to a drive assembly.

In the illustrated embodiment, an auger 130 (which may also be referred to as a "helix blender") is in communication with first portion 124 of threaded shaft 122, and is positioned outside of fluid chamber 110. Auger 130 is preferably coupled to first portion 124 of threaded shaft 122 by a friction fit, although alternatively auger 130 may be integrally formed with threaded shaft 122, for example.

In some embodiments, auger 130 is includes threads that are in a same direction as the threads of threaded shaft 122, and thus auger 130 is configured in these embodiments to urge a fluid such as lubricant 112 in a direction out of fluid chamber 110 when threaded shaft 122 is rotated in a direction that causes fluid chamber 110 to contract, and thus causes lubricant 112 to be urged out of fluid chamber 110.

In some other embodiments, auger 130 is includes threads that are in an opposite direction to the threads of threaded shaft 122, and thus auger 130 is configured in these embodiments to urge a fluid such as lubricant 112 in a direction into fluid chamber 110 when threaded shaft 122 is rotated in a direction that causes fluid chamber 110 to contract. Thus, in these embodiments, auger 130 urges fluid contrary to its direction of travel, imparting a more aggressive mixing action.

Whether the threads of auger 130 are in a same direction or opposite direction to the threads of threaded shaft 122, auger 130 may function as a mixer (or as a blender) to mix or blend lubricant 112 when lubricant 112 is urged out of the at least one fluid outlet 120. This mixing (or blending) function may be advantageous when lubricant 112 has become separated during prolonged storage, for example. This mixing (or blending) function may be accomplished by numerous alternative mixers. In the illustrated embodiment, auger 130 is positioned outside of the at least one fluid outlet 120, but auger 130 may alternatively be positioned inside of the at least one fluid outlet 120.

Figure 4:
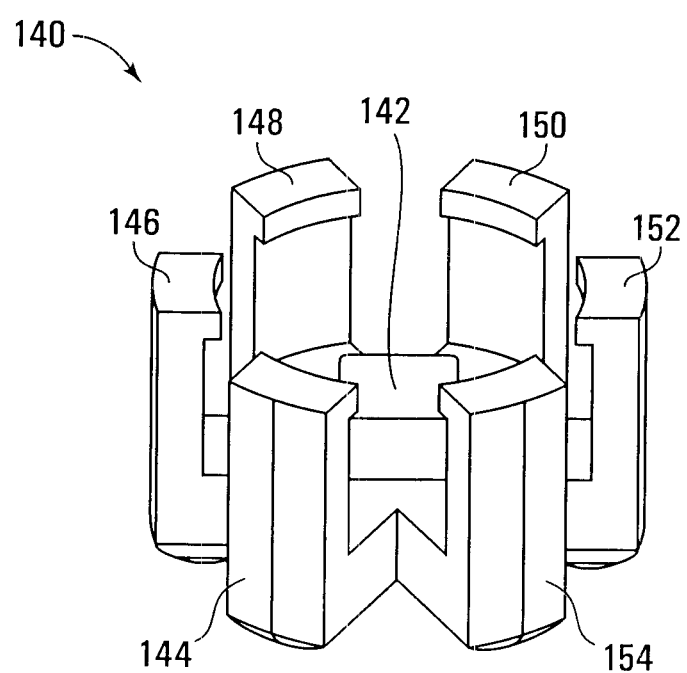
FIG. 4 is a perspective view of an alternative mixer in the fluid holder of FIG. 3.

For example, referring to FIG. 4, an alternative mixer (which may also be referred to as a "blender" or as a "paddle blender"), is shown generally at 140. Mixer 140 may be substituted for auger 130 shown in FIG. 3. Mixer 140 is also preferably coupled to first portion 124 of threaded shaft 122 by a friction fit, but may also alternatively be integrally formed with threaded shaft 122, for example. Mixer 140 includes a projection 142 for being received in a recess of first portion 124 in a friction fit, and includes radial projections 144, 146, 148, 150, 152, and 154 for mixing or blending lubricant 112 when lubricant 112 is urged out of the at least one fluid outlet 120.

Figure 5:
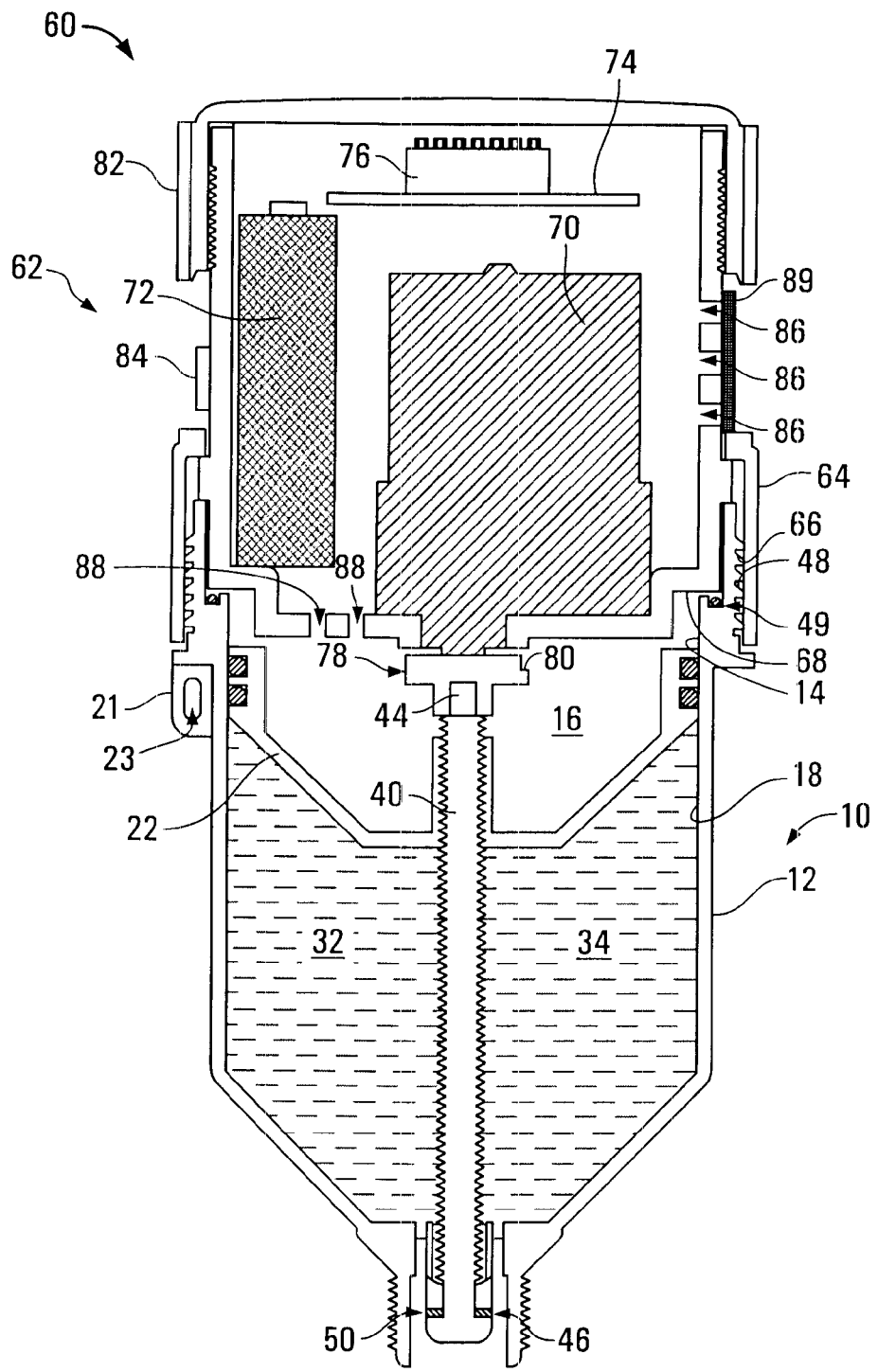
FIG. 5 is a front cross sectional view of an electromechanical lubricator including the fluid holder of FIG. 1.

Referring to FIG. 5, an embodiment of an electromechanical lubricator (which may also be referred to more generally as a "fluid holder") is shown generally at 60. The electromechanical lubricator 60 includes a drive assembly 62 detachably couplable to fluid holder 10 of FIGS. 1 and 2. Although the electromechanical lubricator 60 is, for simplicity, illustrated and described with drive assembly 62 detachably couplable to fluid holder 10, it will be appreciated that drive assembly 62 may also be detachably couplable to fluid holder 90 illustrated in FIG. 3, for example. In the illustrated embodiment, drive assembly 62 includes a ring 64 having an internal threaded surface 66 for threadably engaging external threaded surface 48 of housing 12. In the illustrated embodiment, external threaded surface 48 engages internal threaded surface 66 of ring 64 to urge O-ring 49 against a lower surface 68 of drive assembly 62 to seal cavity 16 from the outside.

In the illustrated embodiment, drive assembly 62 includes a drive motor 70 powered by a battery pack 72 and controlled by a processor circuit 74. The processor circuit 74 receives inputs from a dip switch assembly 76, which may be used to configure parameters for automatic scheduled delivery of the lubricant 34. The delivery of lubricant 34 may, for example, be programmed in cycles wherein a predetermined volume of lubricant is delivered periodically in delivery cycles separated by predetermined intervals of time. The drive motor 70 is preferably geared to apply a torque to a cam coupling 78 that is detachably coupled to the second portion 44 of the threaded shaft 40. The cam coupling 78 preferably includes a trigger 80 for triggering a limit switch (not shown) to count revolutions of cam coupling 78. It will be appreciated that by counting revolutions of cam coupling 78, an estimate may be calculated of the distance through which piston 22 has traveled along the sliding portion 18 of the inner surface 14 of the housing 12, such that an estimate may be calculated of a volume of lubricant 34 that has been urged out of fluid chamber 32 through the at least one fluid outlet 50. However, alternatively, processor circuit 74 may employ a timing function to estimate a volume of lubricant 34 that has been expelled from fluid chamber 32. The drive assembly 62 also includes a threaded cap member 82 threadably engaged with drive assembly 62 for covering the internal components of the drive assembly 62. However, it will be appreciated that in other embodiments, other configurations of drive assembly 62 may be used to apply a torque to the second portion 44 of the threaded shaft 40.

Preferably, drive assembly 62 further includes a temperature sensor interface 84 for interfacing with a temperature sensor (not shown) operable to sense a temperature of an object to be lubricated (not shown). The temperature sensor may be a conventional temperature sensor that is well-known in the art. Preferably, processor circuit 74 responds to signals received from the temperature sensor (not shown) at temperature sensor interface 84, and causes drive assembly 62 to deliver more lubricant 34 to the object to be lubricated (not shown) when the object to be lubricated is at a higher temperature. For example, when a signal received at temperature sensor interface 84 indicates that the object to be lubricated (not shown) exceeds one or more predefined thresholds, the interval of time between delivery cycles may be reduced, or the volume of lubricant delivered in delivery cycles may be increased, or the rate of lubricant delivery during delivery cycles may be increased, for example.

Preferably, the housing of the drive assembly 62 defines one or more openings illustrated generally at 86 for permitting air circulation in and through the inside of drive assembly 62. The one or more openings 86 may be covered with a breathable material 89, such as Tyvek™ available from Dupont™, for example, in order to permit air to enter the inside of the drive assembly 62 while preventing dust and other particles from entering the inside of drive assembly 62. The housing of drive assembly 62 also preferably includes one or more openings shown generally at 88 to permit air from the inside of drive assembly 62 to circulate in and out of cavity 16. Advantageously, when piston 22 is moved in a direction to expel lubricant 34 from fluid chamber 32, air will enter cavity 16 through openings 86 and 88 in order to prevent a vacuum from forming in cavity 16.

In operation, drive assembly 62 applies a torque to the second portion 44 of threaded shaft 40 to rotate the shaft and displace piston 22 along the length of the shaft to urge lubricant 34 out of fluid chamber 32. Once substantially all of lubricant 34 has been expelled from fluid chamber 32, the fluid holder 10 may be removed, and either refilled with lubricant 34 or discarded. The drive assembly 62 may be coupled to a new or refilled fluid holder 10 and reused.

Advantageously, thrust forces resulting from pressure of lubricant 34, rotation of threaded shaft 40, and displacement of piston 22 are accommodated by thrust bearing 46 of the fluid holder 10, that is, the disposable component. Drive assembly 62, which is desirably reused for numerous fluid holders 10, tends not to experience a thrust force from the threaded shaft 40 in the configuration of the present invention, thus reducing wear and prolonging the useful life of the reusable drive assembly 62.

Furthermore, reducing wear on the drive assembly 62 permits more efficient operation of drive assembly 62, thereby reducing current drawn from battery pack 72, and enabling operation of electromechanical lubricator 60 throughout a greater range of temperatures. It has also been found that electromechanical lubricator 60 can generate higher pressures of lubricant 34 as compared to some known electromechanical lubricators because of the reduced wear on the drive assembly 62. For example, pressures in the lubricant 34 of over 200 psi have been achieved in electromechanical lubricators similar to the illustrated example, compared to approximately 70 psi for some known electromechanical lubricators.

In addition, absorption of thrust forces at thrust bearing 46, rather than on drive assembly 62, has been found to reduce the likelihood that fluid holder 10 will separate from drive assembly 62 as a result of accumulated thrust force on threaded shaft 40. Accommodation and relief of thrust forces at thrust bearing 46 may also simplify the process of separating fluid holder 10 from drive assembly 62, because there is less concern about an accumulated thrust force therebetween.

While specific embodiments of the invention have been described and illustrated, such embodiments should be considered illustrative of the invention only and not as limiting the invention. It will be apparent that certain changes and modifications may be practised within the scope of the appended claims.

We claim:

1. A fluid holder comprising:
 a housing having an inner surface defining a cavity, the housing defining at least one fluid outlet in communication with the cavity;
 a piston in slidable engagement with the inner surface of the housing, the piston having first and second opposed surfaces with a threaded opening extending between the first and second opposed surfaces of the piston, the first surface of the piston and the inner surface of the housing defining a fluid chamber in the cavity in communication with the at least one fluid outlet, and the piston being movable to expand or contract the fluid chamber; and
 a threaded member engageable with the threaded opening of the piston, a first portion of the threaded member extending from the first surface of the piston into the fluid chamber, and a second portion of the threaded member extending from the second surface of the piston away from the fluid chamber, the threaded member being rotatably coupled to the housing, at a position on the first portion of the threaded member and spaced apart from the piston, for rotation in the threaded opening of the piston, wherein the housing is configured to accommodate a force from the first portion of the threaded member such that rotation of the threaded member in a fluid chamber contracting direction causes the force to be exerted by the first portion of the threaded member on the housing and on the piston to move the piston in the cavity to contract the fluid chamber.

2. The fluid holder of claim 1 wherein the inner surface of the housing comprises a cylindrically shaped sliding portion, and wherein the piston is in slidable engagement with the cylindrically shaped sliding portion.

3. The fluid holder of claim 1 wherein the inner surface of the housing comprises a frustoconical terminating portion.

4. The fluid holder of claim 3 wherein the first surface of the piston is shaped complementarily to the frustoconical terminating portion.

5. The fluid holder of claim 1 further comprising a mixer coupled to the first portion of the threaded member, the mixer configured to mix fluid urged out said at least one fluid outlet.

6. The fluid holder of claim 5 wherein the mixer includes an auger configured to urge a fluid in a direction into the fluid chamber when the threaded member is rotated in said fluid chamber contracting direction.

7. The fluid holder of claim 5 wherein the mixer includes an auger configured to urge a fluid in a direction out of the fluid chamber when the threaded member is rotated in said fluid chamber contracting direction.

8. The fluid holder of claim 5 wherein the mixer includes a plurality of radial projections.

9. The fluid holder of claim 1 wherein the piston is in sealed engagement with the inner surface of the housing, and wherein the fluid chamber is open only at the at least one fluid outlet.

10. The fluid holder of claim 1 wherein the second portion of the threaded member is configured to be detachably coupled to a drive member for applying a torque to the threaded member.

11. The fluid holder of claim 10 further comprising a drive assembly configured to be detachably coupled to the fluid holder, the drive assembly having a motor and a drive member coupled to the motor and configured to be detachably coupled to the second portion of the threaded member of the fluid holder for applying a torque to the threaded member.

12. The fluid holder of claim 11 further comprising a processor circuit in communication with the motor for controlling the motor, the processor circuit operably configured to respond to signals received from a temperature sensor sensing a temperature of an object to be lubricated, to cause the motor to deliver more fluid from the fluid chamber when the object to be lubricated is at a higher temperature.

13. The fluid holder of claim 1 further comprising a thrust bearing supported by the housing, wherein the first portion of the threaded member is rotatably coupled to the housing at the thrust bearing.

14. The fluid holder of claim 1 further comprising a fluid in the fluid chamber.

15. The fluid holder of claim 14 wherein the fluid comprises a lubricant.

\* \* \* \* \*